June 5, 1928.
F. H. ROYCE ET AL
1,672,091
BRAKE FOR ROAD VEHICLES
Filed June 6, 1925 4 Sheets-Sheet 3
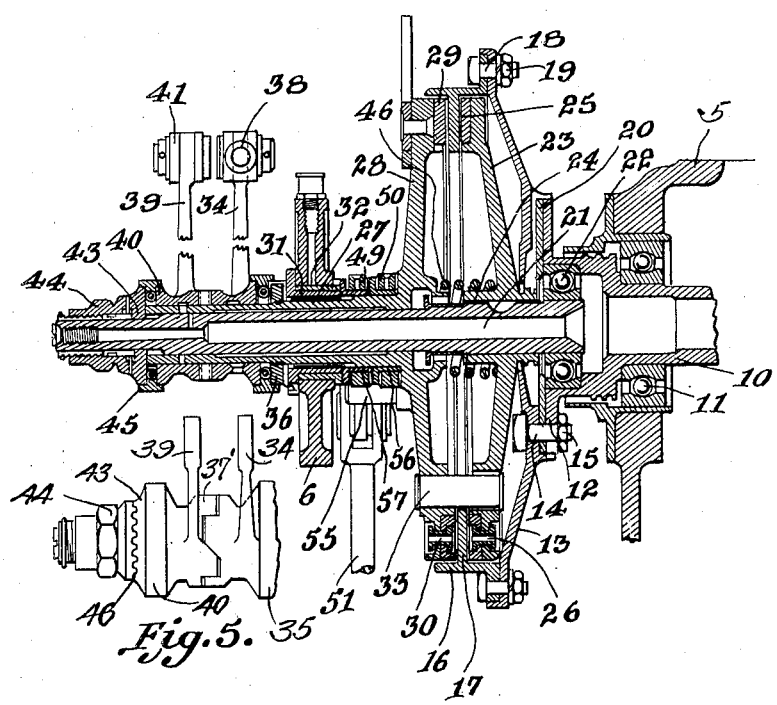
Inventor
Frederick Henry Royce
AND Arthur John Rowledge June 5, 1928.  1,672,091
F. H. ROYCE ET AL
BRAKE FOR ROAD VEHICLES
Filed June 6, 1925  4 Sheets-Sheet 4
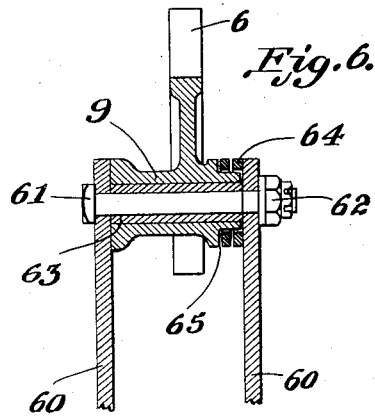
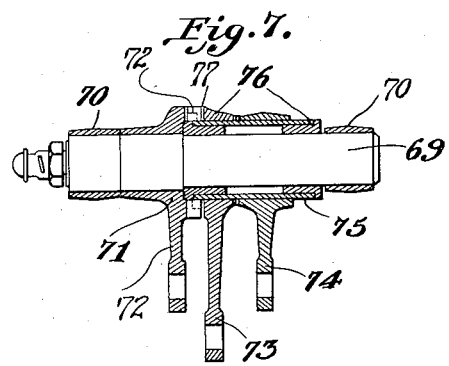
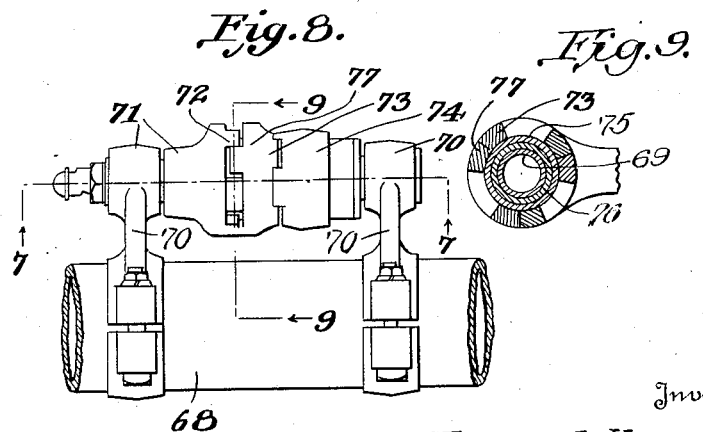
Inventor
Frederick Henry Royce
AND Arthur John Rowledge
By
Attorneys Patented June 5, 1928.

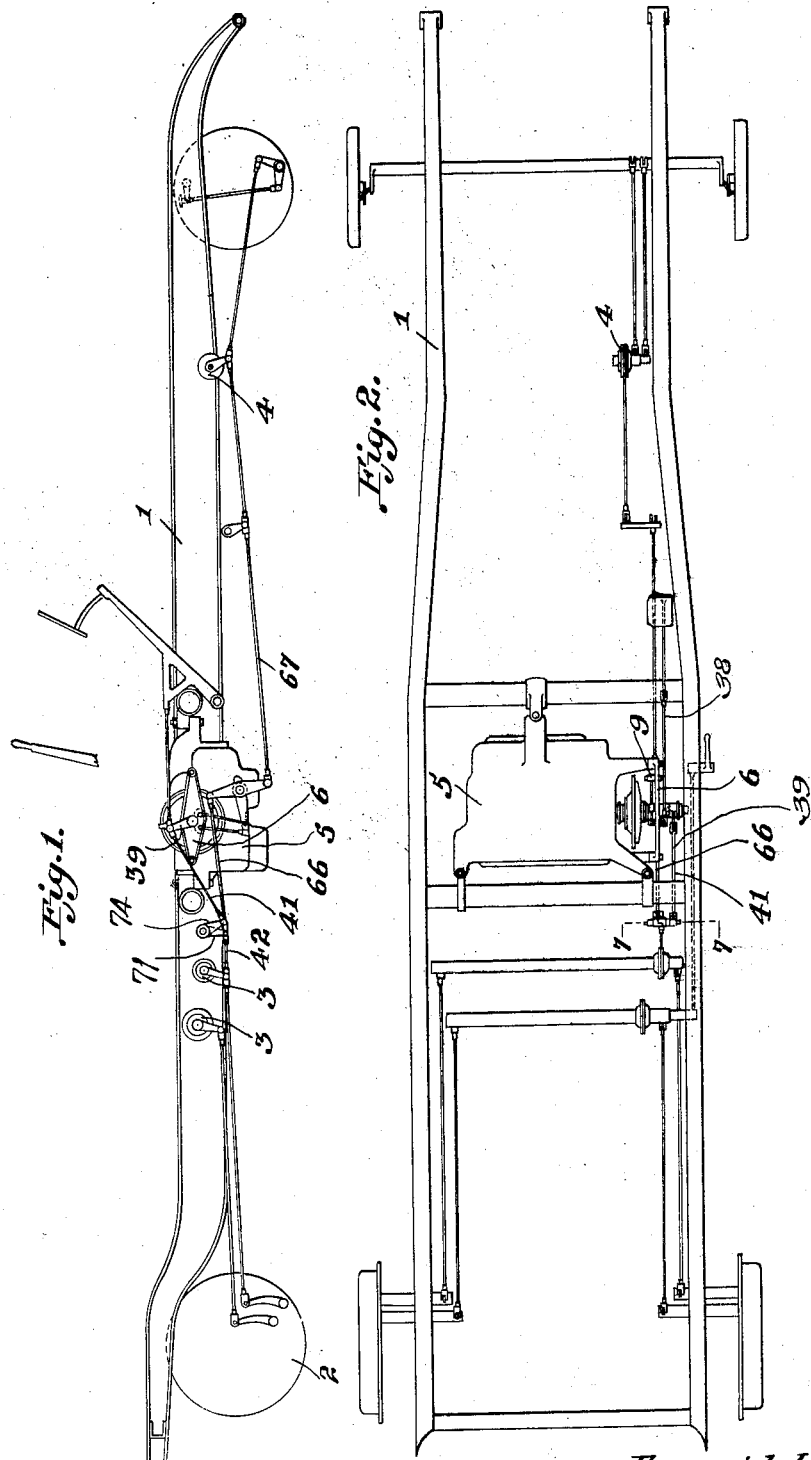

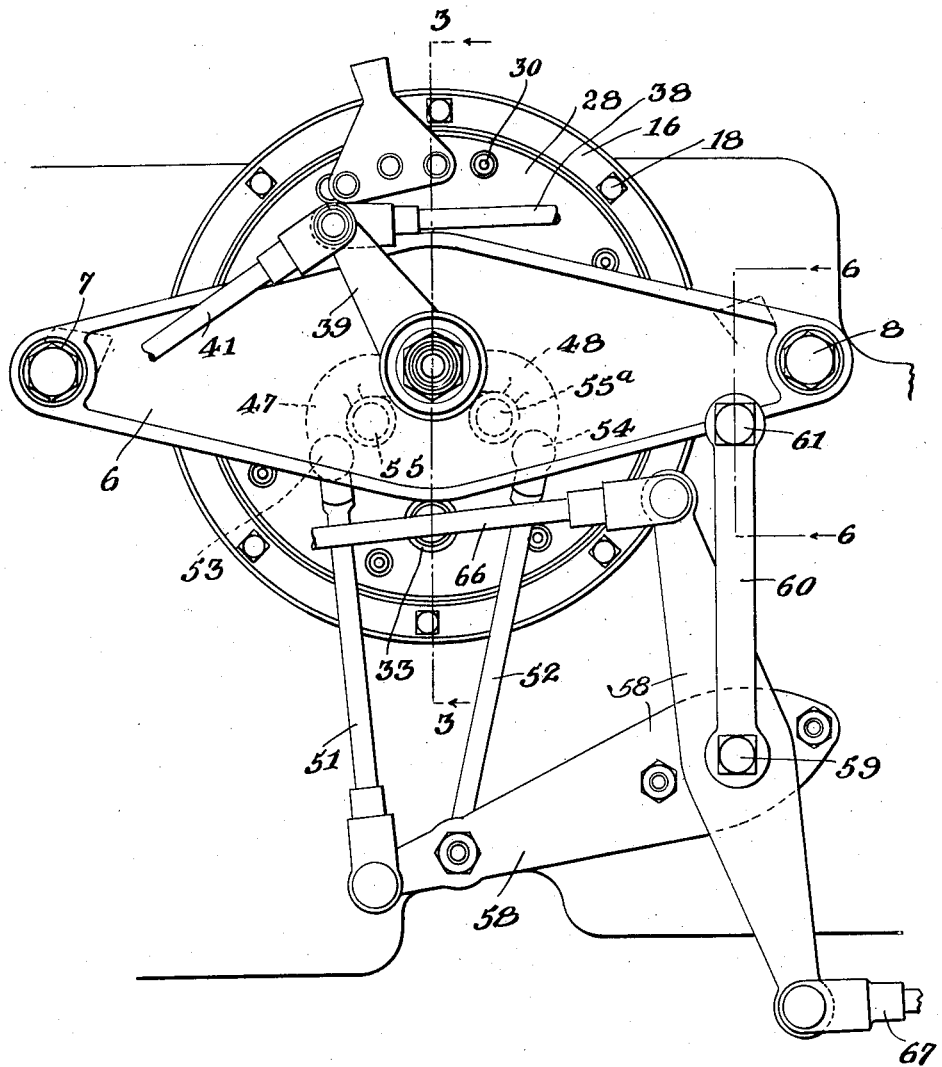

1,672,091

UNITED STATES PATENT OFFICE.

FREDERICK HENRY ROYCE, OF WEST WITTERING, NEAR CHICHESTER, AND ARTHUR JOHN ROWLEDGE, OF ELLERSLIE, ENGLAND, ASSIGNORS TO ROLLS-ROYCE LIMITED, OF DERBY, ENGLAND.

BRAKE FOR ROAD VEHICLES.

Application filed June 6, 1925, Serial No. 35,388, and in Great Britain June 13, 1924.

This invention has reference to brakes for four wheeled road vehicles of the type in which a mechanism commonly called a servo, by means of which the motion of the vehicle is brought to the aid of the driver in applying pressure to the brakes, and is automatically brought into operation when the driver operates a lever. In apparatus made according to this invention a lever actuatable by the driver operates the brakes on the wheels or some of them, preferably the back wheels only, by direct action, that is to say not through the servo mechanism, and at the same time or immediately thereafter causes the servo to operate brakes on all or some, preferably all the wheels of the vehicle, the two functionings being independent so that the direct action is not affected by the servo, even if the vehicle is moving backwards.

With such a brake system we can secure the following advantages to wit: (a) the brake is immediately effective without any interlude to take up slack in the servo mechanism; (b) the servo mechanism can be made effective both on the forward and backward movements of the vehicle and need not be eliminated when the car is moving backward, by the introduction of a one way drive device, as has heretofore been done in the most commonly used forms.

To achieve the above results we construct apparatus comprising the following elements: Two levers, one operable by the driver (hereinafter called "the pedal lever") and the other (hereinafter called "the brake lever") operably connected to some or all of the brakes (preferable those of the back wheels only) each projected from a hub or boss are mounted co-axially side by side with the contiguous faces of their hubs or bosses engaging through the instrumentality of cams or projections or with other suitable means arranged so that the operating of the pedal level will operate the brake lever, and at the same time cause the two levers to separate axially. The axial relative movement operates, through the medium of anti-friction devices such as ball end-thrust bearings, a slipping clutch, one side of which is permanently geared to the road wheels and is constantly rotating, and the other side of which is fixed or geared to a shaft or sleeve so that, on closing the clutch, the torque of the constantly rotating member is communicated (the clutch always slipping) to the said shaft or sleeve.

Two other levers are mounted loosely on the said shaft or sleeve but one is prevented from rotating relatively thereto in one direction, and the other in the other direction, by means of stops rigidly secured to the shaft or sleeve. Each of these levers is secured to mechanism in operable connection with the brakes, so that, no matter which way the sleeve rotates, one or the other of the levers will operate the brakes. All the three described devices to wit, the firstly mentioned two levers i. e. the pedal lever and the brake lever, the members of the clutch and the secondly mentioned two levers are co-axial. In the case where a servo is operating brakes on all four wheels, a distributing device is introduced consisting for example of a three-armed lever with its fulcrum (centrally located) supported by a swinging link. A more detailed description of the preferred form of our invention is as follows:—

The whole apparatus or mechanism apart from the driving member of the clutch is supported by a wall consisting of a thick metal bar or its equivalent rigidly secured to the gear box, the sleeve hereinbefore referred to and which is more particularly hereinafter described being held in bearings in an orifice through such wall, capable of rotational but not of axial movement, and all the axial movements of parts hereinafter described taking place on one side or the other of such wall and being relative to the said sleeve. A shaft (hereinafter called the clutch driving member shaft) is permanently geared to road wheels and hence is constantly rotating when the vehicle is moving. This shaft carries concentrically an annular plate (hereinafter called "the rotating plate") preferably supported at its periphery by a drum which is supported by a skeleton flange connected to the end of the said shaft. Means are provided to admit of axial movement of the rotating plate. Another shaft (hereinafter called "the clutch driven member shaft") is mounted concentrically with the clutch driving member shaft and one end protrudes into the drum. A sleeve (being the member supported by the said wall) is mounted on the clutch driven member shaft extending for part of its length and (but for the connection hereinafter explained) is free on the shaft.

Rigidly fixed to each of them, the clutch driven member shaft and the sleeve, is a skeleton flange, carrying an annular friction disc, one on each side of the revolving plate, so that by relative axial movement of the shaft and sleeve the friction discs will be brought into, or withdrawn from, contact with the revolving plate. Between the friction device and the wall are two levers each projected from a hub rotatably mounted on the sleeve, the two levers are normally on opposite sides of the sleeve and approximately in line with one another, being held in such positions by apparatus about to be explained. There are also projected from the sleeve and rigidly secured thereto two stops to operate respectively on each of the levers so placed that when the sleeve is turned in one direction one of the stops will carry one of the levers with it while the other lever will be left free, while if the shaft is turned in the other direction the other stop will carry the other lever with it and the first one will be left free. From the free ends of each of these levers a connecting rod is hinged, the other ends of which rods are hinged to a lever which when operated actuates the brakes. The effect of this arrangement is that, whichever way the sleeve turns, the act of turning will put on the brakes through the action of one or the other of the levers and connecting rods, while the lever not acted upon will move but inertly in like manner. The mechanism will when the sleeve is freed from functioning return to its normal position under the reaction of suitably arranged springs.

On the other side of the wall two levers each projected from a hub are mounted loosely on the sleeve the inner face of the hub of the inner lever (that is the one nearer the wall, being the pedal lever) impinges against the wall with ball end-thrust bearings intervening, the outer face of the hub of the outer lever (being the brake lever) impinges against an internally axially serrated annular member threaded or mounted on and engaging corresponding serrations on the clutch driven member shaft, and projecting radially beyond the sleeve likewise with ball end-thrust bearings intervening. The said internally axially serrated member is secured on the shaft by means of a nut engaging a thread on the end of the shaft. The pedal lever is operable by the driver and the brake pedal is operably connected to the two back wheel brakes. By making the contiguous faces of the said internally axially serrated member and nut in the form of mutually engaging slope-sided radial serrations, of a depth equal to the minimum total axial clearances necessary between the revolving plate on the one hand and the friction discs on the other hand, the apparatus can be readily correctly adjusted to take up wear of the friction device.

On the contiguous faces of the hubs of the two levers are formed corresponding bevelled or sloped teeth cams or dogs engaging one another so that, when the pedal lever is actuated the brake lever will be actuated likewise, but at the same time the two levers will separate from one another axially.

In the case of a system in which the servo operates brakes on all four wheels of the vehicle the two connecting rods above referred to are connected to a distributing mechanism preferably a three-armed lever (T shaped or approximately so) the fulcrum of which (being centrally located) is supported by a swinging link so that, the front wheel brakes being connected to one of the arms and the back wheel brakes to another and the connecting rods to the third, the mechanism will automatically distribute the braking force between the back wheels and the front wheels, and (assuming that the resistance offered by the braking mechanisms of the front and back wheel brakes to be equal) would operate the two sets of brakes simultaneously, and distribute the force equally between the two sets of brakes. To provide for the possibility of such resistances being unequal in which case the three-armed lever would in the initial stages of its action fulcrum on one of the attachments other than its true or intended fulcrum, and cause that set of brakes whose mechanism offered the lesser resistance to be actuated in advance of the other set, and also to enable, if desired, the force to be distributed in different ratios to the two sets of brakes, we provide a friction device restraining to the required extent the swinging movement of the link.

In the accompanying drawings is shown an example of our invention.

Figs. 1 and 2 are an elevation and plan, respectively, of the whole brake system. Fig. 3 is a side elevation of the servo and its levers to a larger scale. Fig. 4 is a sectional elevation of Fig. 3 on the line 3—3 looking from right to left. Fig. 5 is a part elevation showing some details of the servo engaging mechanism and servo adjustment.

Fig. 6 is a sectional elevation on line 6—6 of Fig. 3, showing the friction damped joint, Fig. 7 is a sectional elevation of the pick up countershaft on line 7—7, Figs. 2 and 8. Fig. 8 is a plan view of Fig. 7 and Fig. 9 an end sectional elevation on line 9—9 of Fig. 8.

1 is the frame of the chassis, 2 the drums on the wheels against which shoes are expanded, 3 are two equalizers respectively distributing load of the pedal and servo, and of the hand brake (when used) evenly between two back wheel brakes, and 4 is an equalizer distributing the load as between the two front wheel brakes 5 is a gear box. 6 is a metal wall rigidly secured to the gear box by set-screws 7 and 8 and having formed thereon boss 9 for a purpose hereinafter described. 10 is the clutch driving member shaft permanently geared through the transmission to the road wheels and hence constantly rotating when the vehicle is moving, carried at one end by ball bearings 11 and at the other by ball bearings not shown and having a flange 12, to which is secured (by bolts 14 and nuts 15) the annular flange 13 to which is secured an annular member 16 with an inwardly projecting annular plate 17 (being the rotating plate) by bolts 18 and nuts 19. 20 is an annular plate clamped between flange 12 and flange 13 to locate the outer race of ball bearings 22 hereinafter referred to and bevelled towards its inner circumference to enable an axial movement of the inner race for purposes hereinafter described. 21 is the clutch driven member shaft concentric with the shaft 10 carried at one end by ball bearings 22 the outer race of which is supported by the shaft 10 and the ball track of which is formed with a cylindrical portion to enable the inner and outer races to move axially relatively to a small prescribed extent, and further by bearings in the wall 6. 23 is an annular flange with an extended hub 24 secured to the shaft 21. 25 is a ring of friction material secured to flange 23 by rivets 26. 27 is a hub or sleeve mounted freely on the shaft 21 carrying a flange 28 which carries the ring of friction material 29 secured thereto by rivets 30. 31 is a flanged sleeve with internal axial serrations engaging serrations on sleeve 27 rotating in bearing bush 32 supported by the wall 6. 33 is one of three-equi-spaced pins riveted in a hole in flange 28 and slidably fitting a hole in flange 23. 34 is the pedal lever extended from the hub 35 freely mounted on the sleeve 27 one face of the hub impinging against a ball-thrust race 36 screwed on sleeve 27 with balls intervening, and the other face having formed on it cam projections 37. The lever 34 is operably connected through the rod 38 with the pedal actuated by the driver. 39 is the brake lever extended from hub 40 freely mounted on the sleeve 27 in operable connection with the back wheel brakes through the rod 41, the pick up device hereinafter described, the rod 42, and an equalizer 3. One face of the hub 40 impinges against a ball thrust race 43 hereinafter described with balls intervening and the other face has formed thereon saw teeth 37' which engage with the saw teeth 37 formed on the face of the hub 35 so that on the lever 34 being actuated the said two hubs 35 and 40 will separate axially. 43 is a ball thrust race with internal axial serrations engaging axial serrations on the sleeve 27. 44 is a nut engaging a thread on the shaft 21. 45 is a thrust ball bearing. The contiguous faces of the race 43 and nut 44 have formed on them engaging teeth. 46 is a spiral spring reacting against the flanges 23 and 28 to keep the friction rings normally out of contact with the rotating plate 17. 47 and 48 are two levers projected from the hubs 49 and 50, freely mounted on the sleeve 27 to which two connecting rods 51 and 52 are respectively pivotally hinged at 53 and 54. 55 and 55ª are two stops projected from bosses on the sleeve 27 respectively engaging the levers 47 and 48. 56 and 57 are flanged bearing bushes secured to sleeve 27, being tightened axially, by the race 36. The connecting rods 51 and 52 are hinged to one arm of the lever 58 hereinafter described. 58 is a three-armed lever pivotally hinged at 59 on the end of a swinging link 60 which is pivotally hinged on bolt 61 passing through the boss 9 and secured by nut 62. 63 is a distance piece. 64 is a spiral spring reacting between the link and a shoulder on the bolt 61 thereby urging one arm of the link into frictional engagement with a boss 9. 65 is a steel washer. The other arms of the lever 58 are operably connected to the back and front brakes, as to the back wheel brakes through rod 66 and as to the front wheel brakes through the rod 67. Referring to Figures 7, 8, and 9, 68 is a cross member, 69 is a shaft rigidly held in brackets 70 which are clipped to cross member 68. 71 is a lever freely mounted on said shaft 69 with jaws 72 on one face of its boss. 73 and 74 are two other levers rigidly fixed together partly by permanently engaging jaws on the contiguous faces of their bosses and partly by being pegged and brazed to the sleeve 75 fitted with bearing bushes 76 freely mounted on the shaft.

On one face of the boss of the lever 73 jaws 77 are formed which interlock with the jaws 72 on the boss of lever 71 with spaces or gaps between the jaws as shown in Fig. 9. Lever 74 is connected to rod 41, lever 71 to rod 66 and lever 73 to rod 42. The result of such mechanism is that on either lever 74 (actuated direct by the pedal lever) or lever 71 (actuated by the servo) being operated the force is applied to the brakes while lever 74 can be effective in advance of lever 71 without disturbing the servo mechanism.

The apparatus functions as follows:—

On the pedal lever 34 being actuated by the driver it ($x$) rotates with it the brake lever 39 thereupon pulling the rod 41 and operating the back wheel brakes and ($y$) causes the hubs 35 and 40 to separate axially relatively thus causing the shaft 21 the flange 23 and the friction ring 25 to move to the left (in Fig. 4) and (on the ring 25 coming into contact with rotating plate 17) carrying with them the shaft 10 and members attached thereto including rotating plate 17, to engage with ring 29 thereby causing rings 25 and 29 to make frictional engagement with the rotating plate 17 and communicating the torque of the shaft 10 to the shaft 21 and sleeve 27 and thereby causing such shaft and sleeve to rotate and one of the stops 55 or 55A to engage one of the levers 47 or 48 and to pull one of the rods 51 or 52 and actuate the lever 58, which thereupon, through rods 66 and 67, puts on the front wheel brakes and adds the force of the servo to the pressure exerted by the driver on the back wheel brakes. The shaft 10 in moving axially carries with it the ball bearings 11 and the other bearings supporting it. The shaft 21 can move axially relatively to shaft 10 by reason of the cylindrical portion in the ball track of the outer race of ball bearings 22.

As the lever 58 is suspended on the swinging link 60 it can adjust its position to communicate the load applied to the front and back wheel brakes as predetermined.

What we claim is:—

1. In a brake system for wheeled vehicles provided with brakes on the front and rear wheels thereof; means including a brake pedal to operate the wheel brakes at one end of the vehicle directly; servo-mechanism consisting of a drive shaft permanently geared to the road wheels of the vehicle, a rock shaft in axial alignment with the drive shaft, means for operably connecting the rock shaft to said brake pedal including a friction clutch connecting the drive shaft to transmit torque from the drive shaft to the rock shaft, a first lever pivoted at one of its ends on said rock shaft, a link pivotally connecting the other end of said first lever to the brake pedal, a second lever pivoted at one end to said shaft, means pivotally connected to the other end of said second lever to operate the wheel brakes at one end of the vehicle, said first and second levers being juxta-posed on said rock shaft and having hubs provided with interengaging cam teeth so inclined that actuation of the first lever by the brake pedal causes a relative movement of both levers axially of said aligned shafts; two one-way oppositely rotatable devices pivoted on said rock shaft, means for connecting said devices to the front and rear wheel brakes of said vehicle and actuated by the operation of said juxtaposed levers, one or the other of said devices being operable according to the direction of rotation of said shafts to effect additional application of all the brakes of the vehicle.

2. A brake system as set forth in claim 1 in which the clutch consists of an annular plate carried by the drive shaft, and two annular friction disks on each side of said plate, one of said friction disks being fixed to said rock shaft, and the other of said disks being slidably mounted thereon and having a sleeve surrounding said rock shaft and extending laterally therefrom, said juxtaposed levers being mounted on said sleeve, a collar fixed on said sleeve in contact with the pivoted end of one of said levers, and a second collar fixed to said rock shaft and in contact with the end of the other one of said juxta-posed levers, and means between said friction disks for holding them normally separated from the annular plate and to hold said juxta-posed levers with their cam teeth in yielding contact with each other.

3. A brake system as set forth in claim 1, in which the clutch consists of an annular plate carried by the drive shaft and two annular friction disks on each side of said annular plate, one of said friction disks being fixed to said rock shaft, and the other of said disks being slidably mounted thereon and having a sleeve extending therefrom along said rock shaft; the said juxta-posed levers being mounted on said sleeve, a collar fixed on said sleeve in contact with the pivoted end of one of said levers, a second collar fixed to said rock shaft and in contact with the pivoted end of the other of said juxta-posed levers, ball thrust-bearings between the outer faces of the hub of the juxta-posed lever and said collar, and means between said friction disks for holding them normally separated from the annular plate and to hold said juxta-posed levers with the cam teeth in yielding contact with each other.

4. A brake system as set forth in claim 1, in which the clutch consists of an annular plate carried by the drive shaft, and two annular friction disks on each side of said plate, one of said friction disks being fixed to said rock shaft and the other of said disks being slidably mounted thereon and having a sleeve surrounding said rock shaft and extending laterally therefrom, said juxtaposed levers being mounted on said sleeve, a collar fixed on said sleeve in contact with the pivoted end of one of said levers, and a second collar fixed to said rock shaft and in contact with the end of the other one of said juxta-posed levers, and yielding means between said friction disks to hold them normally spaced apart from said annular plate, and to hold said juxta-posed lever with their cam teeth in yielding contact with each other.

5. A brake system as set forth in claim 1 in which the clutch consists of an annular plate carried by the drive shaft and two annular disks on each side of said annular plate, means for holding said disks normally separated from said annular plate, one of said disks being fixed to said rock shaft and the other of said disks being slidably mounted thereon and having a sleeve extending laterally therefrom along said rock shaft; the said juxta-posed levers being rotatably mounted on said sleeve with their cam faces in contact with each other, collars mounted on said rock shaft and on said sleeve respectively on opposite sides of said juxta-posed levers, ball thrust-bearings interposed between said collar and the outer faces of said juxta-posed levers, relative angular movement between said justa-posed levers causing said disks to frictionally engage said annular plate, and a separation of said disks by said means tending to restore the juxta-posed levers to their initial positions.

6. A brake system as set forth in claim 1, in which the clutch consists of an annular plate carried by the drive shaft and two annular friction disks on each side of said annular plate, a spiral spring interposed between said disks to hold them normally separated from said annular plate, one of said disks being fixed to said rock shaft and the other being slidably mounted thereon and having a sleeve extending laterally therefrom along said shaft; the said juxta-posed levers being rotatably mounted on said sleeve with their cam faces in contact with each other, a collar fixed to said sleeve in contact with the end of one of said juxta-posed levers, a second collar fixed to said rock shaft, and in contact with the pivoted end of the other of said juxta-posed levers.

7. A brake system as set forth in claim 1, in which the clutch consists of an annular plate carried by the drive shaft and two annular friction disks on each side of said plate, a spiral spring interposed between said disks to hold them normally separated from said plate, one of said disks being fixed to said rock shaft, and the other slidably mounted thereon and having a sleeve extending laterally therefrom and along said rock shaft; a collar fixed on said sleeve, a second collar fixed on said rock shaft, said juxta-posed levers being interposed between said collars with their pivoted ends mounted on said sleeve, ball thrust-bearings interposed between the outer faces of the ends of said levers and said collars; said springs also holding said collars, thrust-bearings and the contacting faces of said juxta-posed levers in yielding contact with each other.

8. A brake system as set forth in claim 1, in which the said two one-way devices includes two members rotatable freely on said rock shaft, a stop fixed to said shaft and adapted to be engaged by either of said members, and a rod hinged to each of said members and operably connected to the brake of said vehicle.

9. A brake system as set forth in claim 1, in which the clutch consists of an annular plate carried by the drive shaft, and two annular friction disks on each side of said plate, means interposed between said disks to maintain them normally separated from said plate, one of said disks being fixed to said rock shaft, and the other slidably mounted thereon and having a sleeve extending laterally therefrom and along said rock shaft; a collar fixed on said sleeve, a second collar fixed to said rock shaft, said juxta-posed levers being mounted on said sleeve and between said collars; the said two one-way devices including two members rotatably mounted on said sleeve, a stop fixed to said shaft and adapted to be engaged by either of said members, and a rod pivotally connecting said brakes to each of said hinged members.

10. A brake system as set forth in claim 1, in which the clutch consists of an annular plate fixed to the drive shaft, and two annular friction disks, one on each side of said plate, means interposed between said disks to maintain them normally separated from said plate, one of said disks being fixed to said rock shaft, and the other being slidably mounted thereon and having a sleeve extending laterally therefrom and along said rock shaft; a collar fixed on said sleeve, a second collar fixed to said rock shaft, said juxta-posed levers being interposed between said collars with one end of each pivotally mounted on said sleeve, ball thrust-bearings interposed between the outer faces of said end of said levers and collars, said means holding said collar, thrust-bearings and contacting faces of said juxta-posed levers in yielding contact with each other; the said two one-way devices including two members rotatably mounted on said sleeve, a stop fixed to said sleeve and adapted to be engaged by either of said members, and a rod eccentrically hinged to each of said members and operably connected to said brakes.

11. A brake system as set forth in claim 1, in which the clutch consists of an annular plate fixed to the drive shaft and two annular friction disks, one on each side of said plate, yielding means interposed between said disks to maintain them normally separated from said plate, one of said disks being fixed to said rock shaft the other being slidably mounted thereon and having a sleeve extending laterally therefrom and along said rock shaft; a collar fixed on said sleeve, a second collar fixed to said rock shaft, said juxta-posed levers being interposed between said collars with one end of each pivotally mounted on said sleeve, ball thrust-bearings interposed between the outer faces of said ends of said levers and collars, said means holding said collar, thrust-bearing and contacting faces of said juxta-posed levers in yielding contact with each other; the said two one-way devices including two members rotatably mounted on said sleeve, a stop fixed to said sleeve and adapted to be engaged by either of said members and a rod eccentrically hinged to each of said members and operably connected to said brakes.

12. A brake system as set forth in claim 1 in which the clutch consists of an annular plate fixed to the drive shaft, and two annular friction disks, one on each side of said plate, a spring interposed between said disks to maintain them normally separated from said plate, one of said disks being fixed to said rock shaft, and the other slidably mounted thereon, and having a sleeve extending laterally therefrom and along said rock shaft; a collar fixed on said sleeve, a second collar fixed to said rock shaft said juxta-posed levers being interposed between said collars with one end of each pivotally mounted on said sleeve, said spring holding said collars and the contacting faces of said juxta-posed levers in yielding contact with each other, relative angular movement of said levers on said sleeve with their consequent axial separation from each other causing said disks to frictionally engage said plate, said spring reacting against the relative movements of said juxta-posed levers to restore the friction disks to their separated positions relative to said plate; the said two one-way devices including two members rotatably mounted on said sleeve, a stop fixed to the said sleeve and adapted to be engaged by either of said members, and a rod operably connecting each of said member to said brakes.

13. A brake system as set forth in claim 1 in which the friction clutch includes a disk slidably mounted on said rock shaft and having a sleeve extending laterally therefrom and around said shaft; the said two one-way devices including a pair of levers oppositely projected from their hubs rotatably mounted on said sleeve and a stop projected from said sleeve into the path of movement of said levers.

14. A brake system as set forth in claim 1, in which the two one-way devices include a pair of levers, each having a hub at one end thereof rotatable about said rock shaft and extending radially in opposite directions from their said hubs and stops projected from said sleeve into the paths of movement of said levers.

15. In a brake system for wheeled vehicles provided with brakes on the front and rear wheels thereof; means including a brake pedal to operate the wheel brakes at one end of the vehicle directly; servo mechanism consisting of a drive shaft permanently geared to the road wheels of the vehicle, a rock shaft in axial alinement with the drive shaft, a friction clutch connecting said shafts to transmit torque from the drive shaft to the rock shaft and including a friction plate having a sleeve extending laterally therefrom along said rock shaft, a pair of levers having juxtaposed hubs provided with cooperating cam faces pivoted on said sleeve, a link connecting the free end of one of said levers to the brake pedal, means pivotally connected to the free end of the other lever to operate the wheel brakes at one end of the vehicle, said cam faces being so inclined that actuation of the first lever by the brake pedal causes relative axial movement of said levers on said sleeve; a pair of rods rotatable on said sleeve and projecting radially therefrom in opposite directions stops projected from said sleeve into the paths of movement of said rods, means for connecting the free ends of said rods to the front and rear wheel brakes of the vehicle and actuated through said rods by the brake pedal operation of said levers, one or the other of said rods being operable according to the direction of rotation of said shafts to effect additional application of all the brakes of the vehicle.

16. A brake system as set forth in claim 15 in which the means connecting the free ends of the rods to the wheel brakes includes a lever having one of its ends pivoted to the free end of one of said rods, a link pivotally suspending the other end of said lever from the vehicle frame, the free end of said second rod being pivotally connected to said lever intermediate its ends, an arm fixed centrally of its ends to the said lever at its pivotal connection with said link, and means connecting the ends of said arm to the vehicle brakes, friction disks on each side of said plate, one of said disks being fixed to said rock shaft and the other being slidably mounted thereon and having a sleeve surrounding said rock shaft, said pair of levers being mounted on said sleeve, a collar fixed on said sleeve in contact with the pivoted end of one of said levers, a second collar keyed to slide axially on said rock shaft, a nut screwed on to the end of said rock shaft to hold the second collar in contact with the pivoted end of the other lever, and yielding means between said friction disks to hold them normally spaced apart from said annular plate; the contacting faces of said nut and second collar being provided with cooperating serrations of a depth equal to the minimum spacing between the annular plate and said disks.

In witness whereof we have signed this specification.

FREDERICK HENRY ROYCE.
ARTHUR JOHN ROWLEDGE.